United States Patent
Schwegler et al.

(10) Patent No.: US 6,439,263 B2
(45) Date of Patent: Aug. 27, 2002

(54) PRESSURE REGULATING VALVE AND METHOD FOR PRODUCING A PRESSURE REGULATING VALVE

(75) Inventors: Helmut Schwegler, Pleidelsheim; Ralph Ittlinger, Weissach; Wolfgang Bueser, Freiberg; Martin Maier; Lorenz Drutu, both of Moeglingen, all of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/741,993

(22) Filed: Dec. 22, 2000

(30) Foreign Application Priority Data

Dec. 24, 1999 (DE) .......................... 199 62 960

(51) Int. Cl.$^7$ .............................................. F16K 21/10
(52) U.S. Cl. .................................. 137/514.5; 137/539.5
(58) Field of Search ........................... 137/514, 514.5, 137/539, 539.5

(56) References Cited

U.S. PATENT DOCUMENTS

| | | | | |
|---|---|---|---|---|
| 4,531,542 A | * | 7/1985 | Looney | 137/514.7 |
| 4,706,705 A | * | 11/1987 | Lee, II | 137/514.5 |
| 5,050,636 A | * | 9/1991 | Sagawa et al. | 137/514 X |
| 5,181,768 A | * | 1/1993 | Wolff | 137/539.5 |
| 5,199,769 A | * | 4/1993 | Beck et al. | 137/514 X |
| 5,293,897 A | * | 3/1994 | Warga et al. | 137/539.5 X |
| 5,595,213 A | * | 1/1997 | Brown | 137/539.5 X |
| 5,692,812 A | * | 12/1997 | Bacardit | 137/539.5 X |
| 5,980,224 A | * | 11/1999 | Regueiro | 137/539.5 X |
| 6,206,032 B1 | * | 3/2001 | Hill | 137/539.5 |

FOREIGN PATENT DOCUMENTS

DE 2520889 * 10/1975 ................. 137/514

* cited by examiner

Primary Examiner—Michael Powell Buiz
Assistant Examiner—Meredith H. Schoenfeld
(74) Attorney, Agent, or Firm—Ronald E. Greigg

(57) ABSTRACT

The pressure regulating valve (2) proposed here can be designed with the aid of the outflow throttle restriction (28) downstream of the valve seat (22) in such a way that the pressure regulating valve (2), as the fluid flow becomes greater, sets or adjusts a smaller pressure difference at the pressure regulating valve (2), as a result of which the line losses that can never be avoided can be compensated for. The pressure regulating valve is suitable in particular for a fuel supply system of a motor vehicle having an internal combustion engine.

23 Claims, 5 Drawing Sheets

PRESSURE REGULATING VALVE AND METHOD FOR PRODUCING A PRESSURE REGULATING VALVE

FIELD OF THE INVENTION

The invention is based on a pressure regulating valve and a method for producing a pressure regulating valve.

BACKGROUND OF THE INVENTION

German Published, Unexamined Patent Application DE 197 54 243 A1 shows a pressure regulating valve of a fuel supply system. A supply line leads to the pressure regulating valve, and a line extending onward carries the fuel away from the pressure regulating valve. Depending on the change in magnitude of the fluid flow flowing through the pressure regulating valve, the flow resistances in the supply line and in the line leading onward vary. These fluctuations in flow resistances cause troublesome fluctuations in the pressure level that is to be regulated by the pressure regulating valve in the fuel supply system. Because especially the line leading onward is often relatively long and should have the smallest possible cross section, the flow resistances in the line leading onward fluctuate considerably, as a function of the magnitude of the fluid flow. As a result, the pressure level regulated by the pressure regulating valve undesirably fluctuates very greatly as well.

Additionally, in the pressure regulating valve shown in DE 197 54 243 A1, a damping device is provided, which is intended to prevent excessive oscillation of the closing body of the pressure regulating valve. However, in the known pressure regulating valve, the damping device has the disadvantage that for lack of an adequate flow through the damper chamber, gas can accumulate, which can very severely impair the damping action of the damping device. Another disadvantage is that the closing body has a complicated shape, making its production relatively complicated and expensive. Another disadvantage is that the tappet connecting the damper piston to the ball is immediately adjacent the closing body in the region of the valve seat, and as a result dimensional imprecisions arise that can lead to leakage, which cannot be allowed. A further disadvantage is that if adequate damping action is to be achieved, the damper piston must be guided with very tight play. This means the pressure regulating valve is severely vulnerable to dirt.

OBJECT AND SUMMARY OF THE INVENTION

The pressure regulating valve according to the invention and the method for producing a pressure regulating valve have the advantage over the prior art that a substantially simpler to produce and markedly better-functioning pressure regulating valve is available. In particular, excellent values regarding tightness, pressure regulation quality, and the desired small structural size are attainable.

In particular, the advantage is obtained that whenever the closing body has lifted at least partly away from the valve seat, a pressure backs up upstream of the outflow throttle restriction, and this backed-up pressure additionally acts on the closing body in the opening direction. This has the advantage that when the fluid flow flowing through the pressure regulating valve increases, the closing body, at a large fluid flow, lifts increasingly far from the valve seat, and that as a result, as the fluid flow becomes larger, the flow resistance through the pressure regulating valve decreases. Since often in the line upstream of the pressure regulating valve and especially in the line downstream of the pressure regulating valve the resistance rises as the fluid flow increases, the possibility exists, because of this decreasing characteristic curve of the pressure regulating valve, of compensating for these flow resistances in the lines, so that the pressure to be regulated by the pressure regulating valve can be kept constant, largely independently of the magnitude of the fluid flow.

If the outflow throttle restriction is disposed on one side relative to the fluid opening, this has the advantage that the closing body is pressed unilaterally against its guide. As a result, conditions that are defined precisely in terms of hydraulics and mechanics are advantageously obtained in the region between the closing body and the valve seat and also between the closing body and the closing body guide. This has the advantage that the closing body rests eccentrically on one side on the closing body guide, always in the same way, and that as a result, an easily controlled, unchanging, predictable, constant regulating behavior of the pressure regulating valve is assured. Another advantage is that between the closing body guide and the closing body, always-constant, easily controlled frictional forces are assured. These frictional forces offer the advantage of an additional easily controlled damping. The overall result obtained is a constant, easily controlled regulating behavior of the pressure regulating valve.

Because the outflow throttle is provided radially outside the closing body guide, a relatively large annular gap is obtained around the valve seat between the closing body and the dividing wall, so that the fluid flowing through between the closing body and the valve seat can flow through with uniform distribution over the circumference and can then flow tangentially around the closing body in the direction of the outflow throttle restriction and can then flow out in the direction of the fluid continuation.

If the closing body guide is formed by a sheath and the outflow throttle restriction is provided in the sheath, in which case the outflow throttle restriction can be formed in a very simple way by a simple hole in the sheath, the overall result is an especially low production cost.

If the closing body is formed by at least one ball, this has the advantage of ease of manufacture, and very good quality is also attainable at low effort and expense.

If the closing body is formed by at least two balls solidly joined together, this has the advantage that especially good throttling with a relatively large gap is attainable at low production cost and effort for the delivery throttle opening. The relatively large gap that is allowed offers the advantage of less vulnerability to dirt, and production variations, which can never be avoided entirely, are not as critical. Another advantage is that if balls are used, canting of the closing body in the closing body guide need not be feared.

With the damping devise, through which the fluid flow flows constantly when the closing body is lifted from the valve seat, having the damper chamber, and with the delivery throttle opening and the discharge throttle opening, the advantage is attained that no gas bubbles can accumulate in the damper chamber. Because the damper chamber has a fluid flow flowing through it, even the smallest air bubbles or outgassing of fuel are entrained constantly by the fluid flow. This has the advantage that the damping action functions highly reliably.

Since a fluid flow constantly flows through the damper chamber when the fluid opening is at least partly open, and since where there is a throttle restriction the flow resistance typically rises quadratically as a function of the fluid flow, very good damping action is obtained. The damping action in this damping device is substantially greater than in a damping device that has a damper chamber without a flow through it. As a result, the flow cross-sectional areas of the delivery throttle opening and the discharge throttle opening can be substantially larger than in a damping device with a damper chamber that does not have a fluid flow flowing through it. Production is therefore substantially simpler, and in particular the dimensional and shape tolerances to be adhered to are not as close, and the damping device is substantially less vulnerable to dirt.

If the gap between the closing body and the closing body guide is used to act as a delivery throttle opening, this has the advantage that the delivery throttle opening can be produced without additional expense.

If the hole that forms the discharge throttle opening is disposed such that it points upward out of the damper chamber, this has the advantage that entrainment of gas bubbles from the damper chamber can be improved still further and is assured highly reliably.

The invention will be better understood and further objects and advantages thereof will become more apparent from the ensuing detailed description of preferred embodiments taken in conjunction with the drawing.

DESCRIPTION OF THE PREFERRED EMBODIMENTS

The pressure regulating valve embodied according to the invention serves to regulate a pressure in a chamber that contains a fluid, for instance for regulating a pressure difference between a chamber at a higher pressure and another chamber at a lower pressure. The pressure regulating valve is suitable especially in fuel supply systems, and the fluid is preferably a liquid, especially fuel and preferably gasoline, but it can also be diesel fuel. The pressure regulating valve can be used preferably in internal combustion engines in which a pressure of the fuel in the fuel supply system is to be regulated. The pressure regulating valve is mounted at some suitable mounting point in the fuel supply system. The mounting point is for instance an opening in a fuel distributor tube belonging to the fuel supply system, or an opening in a housing of a fuel pump of the fuel supply system, or a cap of a fuel tank, or the pressure regulating valve is installed in the housing of a fuel filter.

By means of the fuel supply system, fuel pumped by a fuel pump flows via a pressure line to the mounting point that receives the pressure regulating valve and thus reaches the fluid inlet of the pressure regulating valve. From the fluid continuation of the pressure regulating valve, fuel is returned to the fuel tank, for instance, or flows to a consumer that receives the fuel, such as an injection valve that meters the fuel to an internal combustion engine. The fuel is preferably gasoline, and the engine together with the fuel supply system is preferably installed in a motor vehicle.

Figure 1:
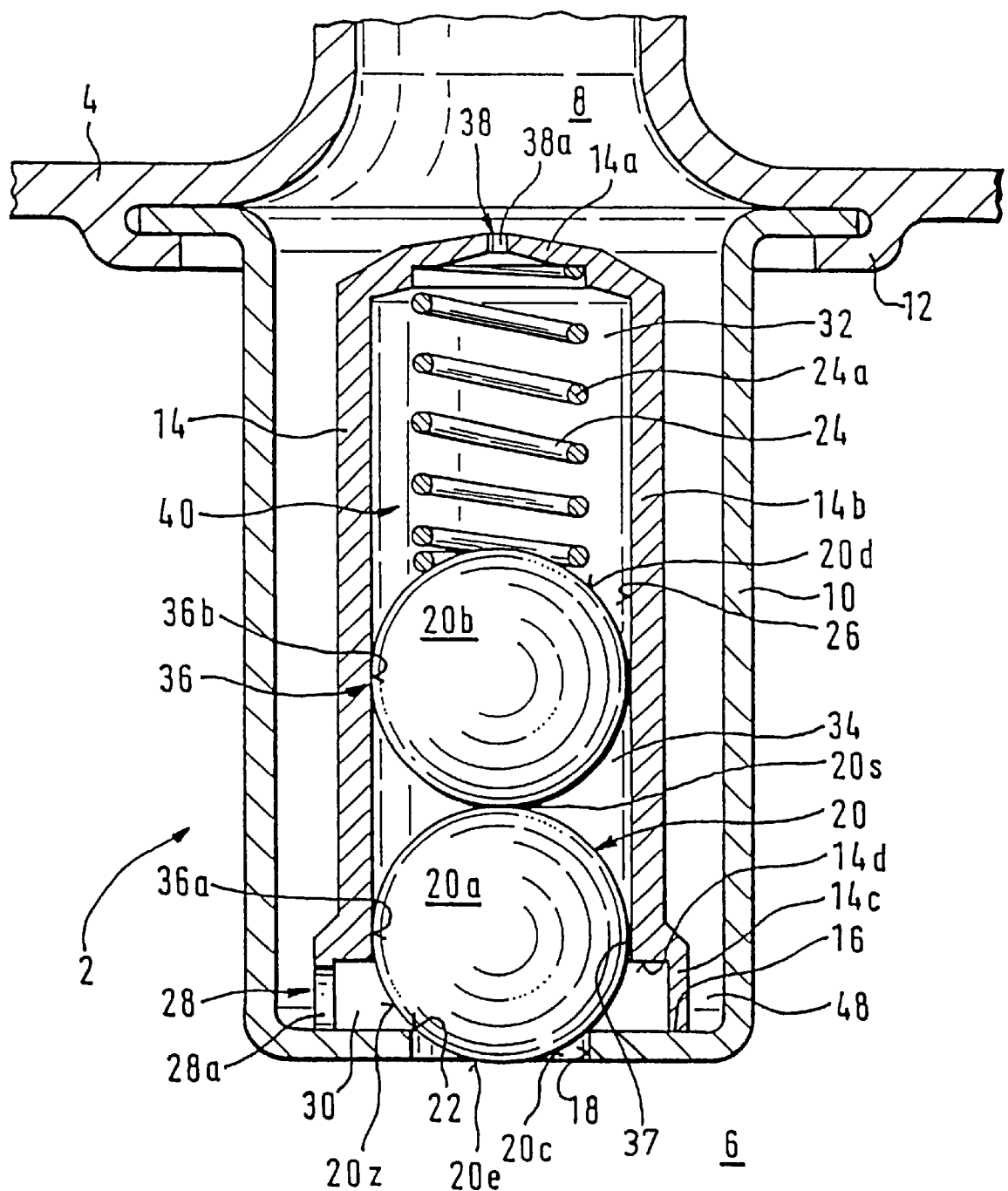
FIG. 1 is a longitudinal section through a selected, preferred, especially advantageous exemplary embodiment.

FIG. 1 shows a longitudinal section through an especially advantageous pressure regulating valve 2 selected as a preferred example for the explanation herein. This exemplary pressure regulating valve 2 is a substantially rotationally symmetrical structure.

The pressure regulating valve 2 is built into a housing 4, for instance, which is shown only in part. The housing 4 is the housing of a fuel filter, for instance. In the housing 4, there is a fluid inlet 6 and a fluid continuation 8. From a fuel pump, not shown, the pumped fluid passes via the fluid inlet 6 to the pressure regulating valve 2, and from the pressure regulating valve 2, via the fluid continuation 8, the fluid returns to a fuel tank, not shown. The pressure of the fluid in the fluid inlet 6 should be greater, by a specific pressure difference, than the pressure of the fluid in the fluid continuation 8. A dividing wall 10 divides the fluid continuation 8 from the fluid inlet 6. The dividing wall 10 is joined in fluid-tight fashion to the housing 4 via a crimped edge 12 extending all the way around.

A thimble-like sheath 14 is solidly joined to the dividing wall 10, for instance via a materially bonded connection 16. By way of example, the materially bonded connection 16 is a spot weld, in particular a resistance-welded spot, or an adhesive bond, by way of which the sheath 14 is affixed to the dividing wall 10. A fluid opening 18 is provided in the dividing wall 10. Depending on a position of a closing body 20, the fluid inlet 6 communicates with the fluid continuation 8 through the fluid opening 18. The closing body 20 has one side 20c toward the fluid inlet 6 and one side 20d remote from the fluid inlet 6.

In the preferred exemplary embodiment, a circular valve seat 22 is provided on the side of the dividing wall 10 toward the fluid continuation 8, on the circumference of the fluid opening 18. A spring device 24 urges the closing body 20 against the valve seat 22. The spring device 24 engages the side 20d of the closing body 20 and presses the side 20c against the valve seat 22. In the preferred exemplary embodiment selected, the sheath 14 has an end portion 14a remote from the fluid opening 18, a cylindrical portion 14b, and a radially widened portion 14c on the end of the cylindrical portion 14b remote from the end portion 14a. The sheath 14 has a shoulder 14d between the cylindrical portion 14b and the widened portion 14c.

The inner jacket face of the cylindrical portion 14b of the sheath 14 forms a closing body guide 26. The closing body guide 26 serves to guide the closing body 20, and at the narrowest point between the closing body 20 and closing body guide 26, a constriction 37 is formed. As a function of the pressure difference between the pressure in the fluid inlet 6 and the pressure in the fluid continuation 8, the closing body 20 lifts more or less far away from the valve seat 22, counter to the force of the spring device 24.

An outflow throttle restriction 28 is provided in the widened portion 14c of the sheath 14. An intermediate pressure chamber 30 extending all the way around is formed, bounded by part of the closing body 20, by the valve seat 22, by part of the dividing wall 10, by the widened portion 14c of the sheath 14, and by the shoulder 14d of the sheath 14.

The outflow throttle restriction 28 is formed by a throttle opening 28a provided in the widened portion 14c or on the widened portion 14c of the sheath 14. The throttle opening 28a is easily produced in the form of a slot made on the sheath 14, or a bore made in the sheath 14.

In the preferred, selected, especially advantageous exemplary embodiment, the closing body 20 comprises a first ball 20a, toward the valve seat 22, and a second ball 20b. The first ball 20a and the second ball 20b are solidly joined together, for instance via a spot weld 20s. The side 20c is located on the first ball 20a, and the side 20d is located on the second ball 20b.

The ball 20a of the closing body 20 has a face that is surrounded by the valve seat 22 and is acted upon hydraulically by the inflow pressure prevailing in the fluid inlet 6; this face will be hereinafter called the inlet pressure face 20e.

Between the valve seat 22 and the narrowest point between the ball 20a and the closing body guide 26, or in other words at the constriction 37, there is an encompassing annular face 20z, which is acted upon by the intermediate pressure prevailing in the intermediate pressure chamber 30. This face will hereinafter be called the intermediate pressure face 20z. Of the intermediate pressure face 20z, it is the area component of the cross-sectional area transverse to the direction of motion of the closing body 20 that is hydraulically operative.

As the drawing shows, the spring device 24 comprises a helically wound spring 24a, which is braced on one end on the end portion 14a of the sheath 14 and on the other on the side 20d of the second ball 20b of the closing body 20.

A damper chamber 32 is formed, bounded in the axial direction by the side 20d of the second ball 20b of the closing body 20 on one side and by the end portion 14a of the sheath 14 on the other, and in the radial direction by the inner jacket face of the cylindrical portion 14b of the sheath 14.

At the narrowest point between the first ball 20a of the closing body 20 and the closing body guide 26, a first guidance gap 36a is created, and at the narrowest point between the second ball 20b and the closing body guide 26, a second guidance gap 36b is created. An intermediate chamber 34 is formed between the two guidance gaps 36a and 36b. The first guidance gap 36a and the second guidance gap 36b are connected in series in hydraulic terms and form a delivery throttle opening 36, which forms constriction 37. In the end portion 14a, a hole 38a is provided at the highest point of the sheath 14, in terms of the installed position. The hole 38a forms a discharge throttle opening 38.

If the pressure in the fluid inlet 6 is enough higher than in the fluid continuation 8 that the closing body 20 has lifted from the valve seat 22, then the fluid flowing out of the fluid inlet 6 through the outflow throttle restriction 28 into the fluid continuation 8 is throttled at the outflow throttle restriction 28. This creates a pressure in the intermediate pressure chamber 30 that is higher than the pressure in the fluid continuation 8. The pressure prevailing in the intermediate pressure chamber 30 will hereinafter be called the intermediate pressure. Because of the pressure difference between the intermediate pressure in the intermediate pressure chamber 30 and the pressure in the fluid continuation 8, some of the fluid flows through the delivery throttle opening 36 into the damper chamber 32 and from there through the discharge throttle opening 38 into the fluid continuation 8.

The outflow throttle restriction 28, or in concrete terms the throttle opening 28a, is disposed such that the fluid flow flowing through the delivery throttle opening 36, the damper chamber 32, and the discharge throttle opening 38 rejoins the fluid flow, flowing through the outflow throttle restriction 28, downstream of the outflow throttle restriction 28.

The cross-sectional areas of the delivery throttle opening 36 and of the discharge throttle opening 38 are adapted to the cross-sectional area of the throttle opening 28a of the outflow throttle restriction 28 in such a way that the fluid flow flowing through the damper chamber 32 is substantially less than the fluid flow flowing through the outflow throttle restriction 28.

The intermediate pressure prevailing in the intermediate pressure chamber 30 also acts in the opening direction on the intermediate pressure face 20z of the closing body 20. With increasing overpressure in the fluid inlet 6, for instance if the fluid flow that is supposed to flow out of the fluid inlet 6 into the fluid continuation 8 is greater, then the first ball 20a lifts increasingly far from the valve seat 22. As a result, the intermediate pressure in the intermediate pressure chamber 30 also rises accordingly, which causes the closing body 20 to lift still farther from the valve seat 22. With the outflow throttle restriction 28 and by means of the intermediate pressure thus engendered, it can be attained that with increasing magnitude of the fluid flow, the closing body 20 lifts disproportionately far from the valve seat 22. The effect of the disproportionate lifting of the closing body 20 is that with an increasing fluid flow, the pressure difference between the pressure in the fluid inlet 6 and the pressure in the fluid continuation 8 lessens. Accordingly, a regulated pressure is obtained that decreases as a function of the increasing fluid flow. By a choice of the free cross-sectional area of the outflow throttle restriction 28, the increase in proportion between the pressure difference at the pressure regulating valve 2 and the fluid flow can be adapted to the flow resistances, which increase as the fluid flow increases, in the lines upstream and downstream of the pressure regulating valve 2 in such a way that overall, regardless of the magnitude of the fluid flow, a constant pressure prevails in the chamber whose pressure is to be regulated with the pressure regulating valve 2. With the aid of the intermediate pressure in the intermediate pressure chamber 30, it is easily possible to compensate for line resistances that are dependent on the magnitude of the fluid flow.

Because of the shoulder 14d of the sheath 14, the intermediate pressure chamber 30 extending annularly all the way around is given a relatively large cross-sectional area, as FIG. 1 shows. This offers the advantage that the fluid can flow out of the fluid opening 18 over the entire circumference of the fluid opening 18 between the valve seat 22 and the ball 20a into the intermediate pressure chamber 30, and because of the large cross-sectional area of the intermediate pressure chamber 30, the fluid can flow largely unthrottled through the intermediate pressure chamber 30 to the outflow throttle restriction 28. Because of the large cross-sectional area of the intermediate pressure chamber 30, the intermediate pressure can act on the intermediate pressure face 20z everywhere and uniformly.

It is proposed that only a single throttle opening 28a be provided for the outflow throttle restriction 28 in the sheath 14, preferably in the widened portion 14c of the sheath 14. A plurality of throttle openings distributed uniformly over the circumference in the widened portion 14c is possible. The unilateral disposition of the throttle opening 28a assures that as soon as the ball 20a has lifted from the valve seat 22, the closing body 20 is pressed radially in the direction of the throttle opening 28a against the closing body guide 26. As a result, a precisely defined location of the closing body 20 is attained that remains constant. Thus hydraulically precisely defined conditions are obtained with regard to the fluid flow flowing through the damper chamber 32. Also by the contact of the closing body 20 with the closing body guide 26, mechanical friction is achieved, which makes an additional contribution to the hydraulic damping device 40 to prevent oscillation of the closing body 20.

The delivery throttle opening 36, the damper chamber 32, and the discharge throttle opening 38 in cooperation form the damping device 40.

As soon as the closing body 20 has lifted somewhat from the valve seat 22, some of the fluid flow flows out of the intermediate pressure chamber 30 through the delivery throttle opening 36, or more precisely through the first guidance gap 36a into the intermediate chamber 34 and then through the second guidance gap 36b, wherein the guidance gaps 36a and 36b form constriction 37, into the damper chamber 32, and then from the damper chamber 32 through the discharge throttle opening 38 into the fluid continuation 8. The delivery throttle opening 36 and the discharge throttle opening 38 form two throttles, connected hydraulically in series, as a result of which a pressure arises in the damper chamber 32 that in terms of the pressure value is between the pressure in the fluid inlet 6 and the pressure in the fluid continuation 8, or between the pressure in the intermediate pressure chamber 30 and the pressure in the fluid continuation 8.

Figure 2:
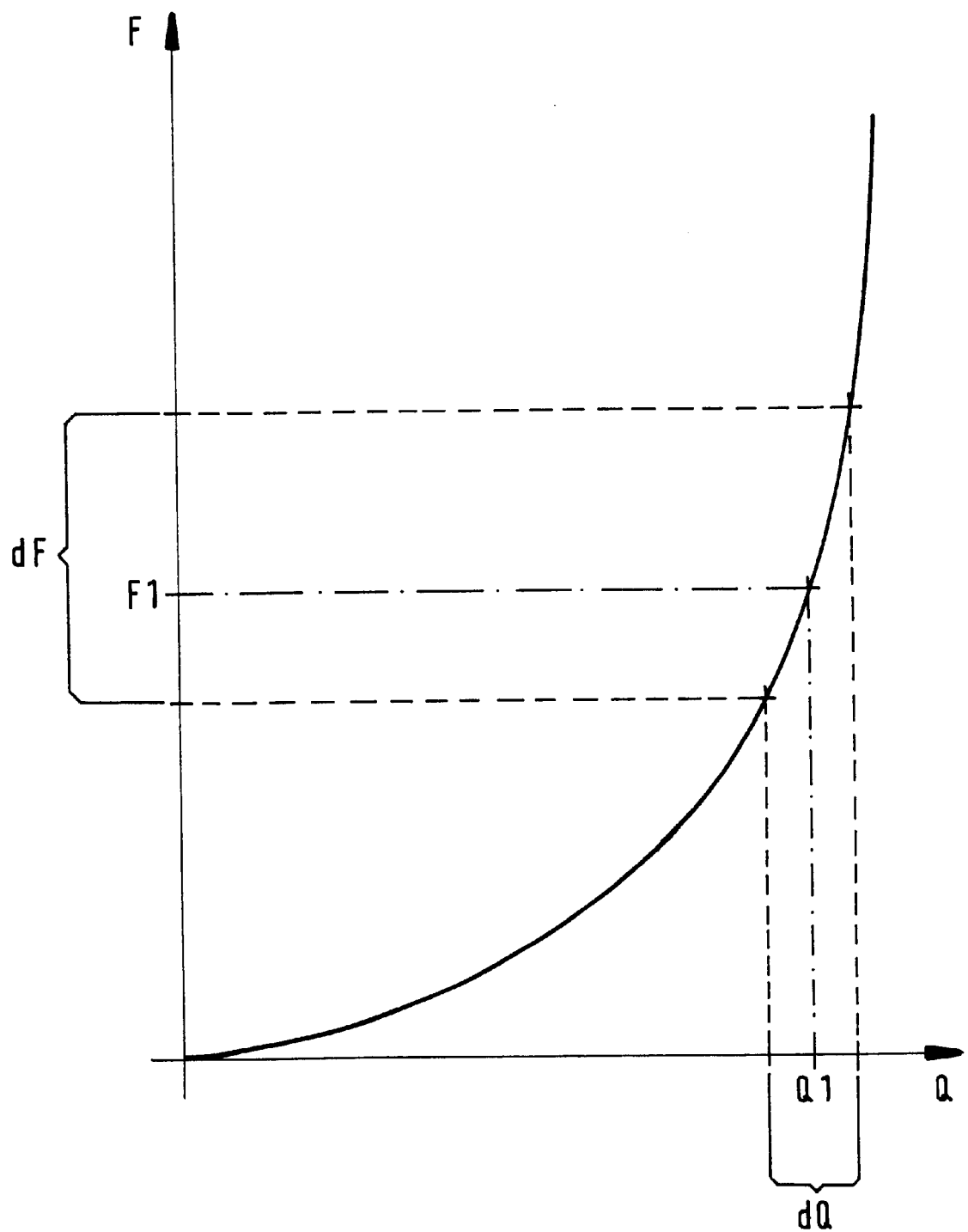
FIG. 2 is a graph showing the dependency between the hydraulic supplementary closing force F and the fluid flow Q flowing the damper chamber.

The pressure prevailing in the damper chamber 32 acts hydraulically as a supplementary closing force F, in addition to the force of the spring device 24, on the closing body 20 in the closing direction. The graph shown in FIG. 2 illustrates the dependency between the hydraulically acting supplementary closing force F and the fluid flow Q flowing through the discharge throttle opening 38. The dependency is parabolic.

Assuming a mean fluid flow Q1, as an example, the mean hydraulic supplementary closing force F1 is obtained. Any possible oscillation of the closing body 20 leads to oscillation of the fluid flow Q flowing through the discharge throttle opening 38. For the purposes of this explanation, let it be assumed that the fluid flow Q fluctuates by the amount dQ, for instance. Because of the dependency illustrated in FIG. 2, the hydraulic supplementary closing force F then fluctuates by the amount dF. This fluctuation of the supplementary closing force F by the amount dF is oriented counter to the motion of the closing body 20. Because of the fluid flow Q1 that flows constantly through the discharge throttle opening 38, and because of the principle of throttling, even a slight fluctuation dQ in the fluid flow Q produces a relatively major fluctuation dF in the closing force F. It can be seen from FIG. 2 that the fluctuation of the supplementary closing force F by the amount dF depends on the magnitude of the mean fluid flow Q. Without the mean fluid flow Q, the fluctuation dF in the supplementary closing force F would be less; that is, the hydraulic damping would be substantially less effective. The advantages thus obtained that even with a relatively large gap between the closing body 20 and the closing body guide 26, or in other words despite a relatively large first guidance gap 36a and a relatively large second guidance gap 36b, adequately good damping of the oscillation of the closing body 20 can nevertheless be achieved. Because of the relatively large guidance gaps 36a and 36b that are possible, the expense for producing the guidance gaps 36a and 36b is relatively slight, and little sensitivity to dirt is obtained, so that even certain dirt particles in the fluid do not lead to seizing of the closing body 20.

The branching off of the fluid flow, flowing through the damper chamber 32, from the intermediate pressure chamber 30 has the advantage that, when the fluid opening 18 is at least partly open, and on account of the intermediate pressure backed up in the intermediate pressure chamber 30, a constant flow through the damper chamber 32 is assured, and nevertheless the advantage is obtained that whenever the closing body 20 is seated on the valve seat 22, a fluid flow flowing through the damper chamber 32 is reliably prevented.

Figure 3:
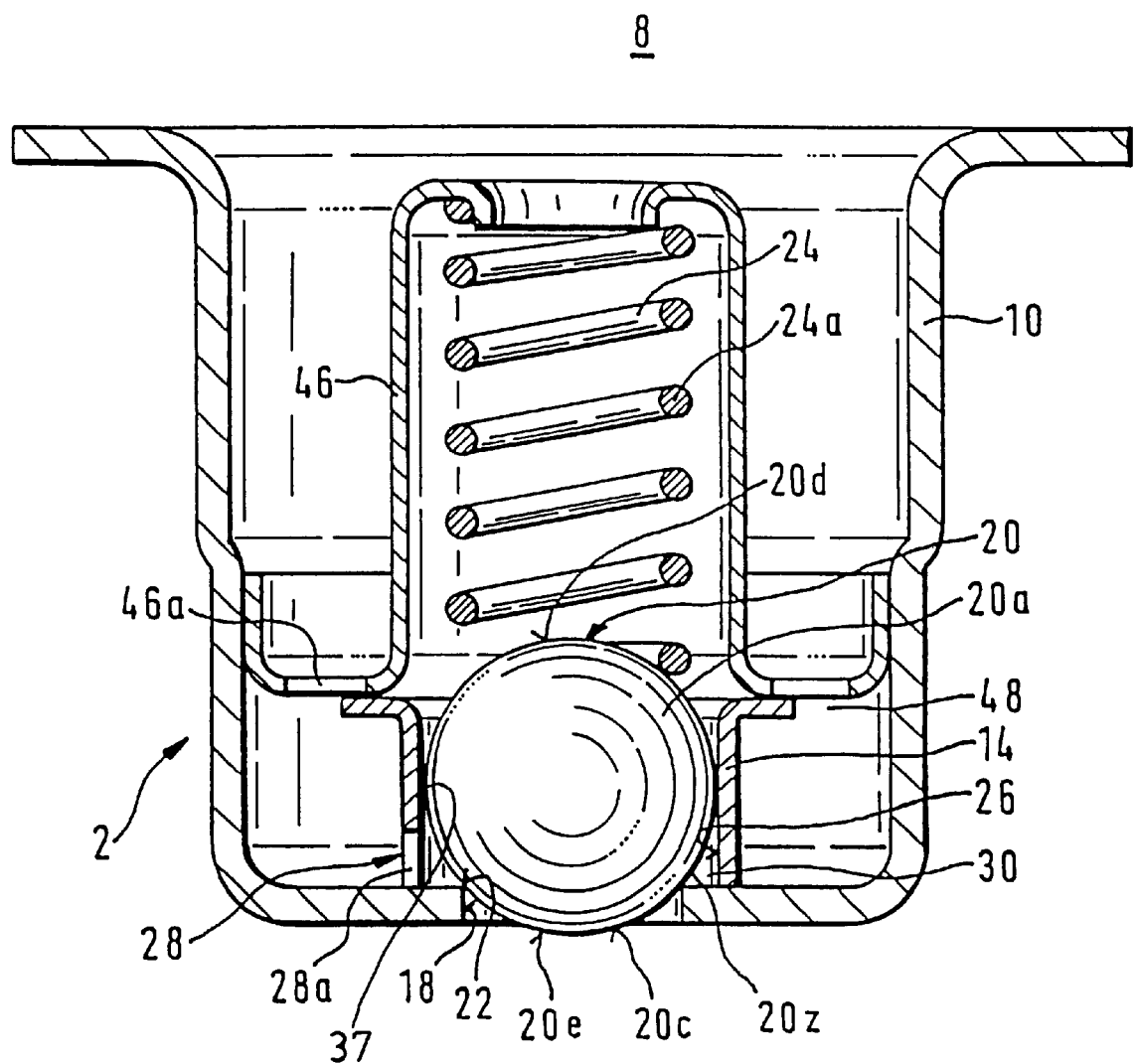
FIGS. 3–5 each show one longitudinal section through three further differently embodied, preferably selected and especially advantageous exemplary embodiments.

FIG. 3 shows a longitudinal section through a further preferably selected, especially advantageous exemplary embodiment.

In all the drawing figures, elements that are the same or function the same are provided with the same reference numerals. Unless otherwise noted or shown in the drawing, what is mentioned and shown in conjunction with one of the drawing figures applies to the other exemplary embodiments as well. Unless otherwise stated in the explanation, the details of the various exemplary embodiments can be combined with one another.

In the modified exemplary embodiment shown in FIG. 3, the closing body 20 is embodied by the single ball 20a. Here the spring 24a of the spring device 24 acts on the single ball 20a that forms the closing body 20.

In this exemplary embodiment as well, the outflow throttle restriction 28 is formed by the throttle opening 28a provided in the sheath 14. A closing body guide 26 is again provided on the sheath 14. For the sake of simplicity in producing the pressure regulating valve 2, a graduation of the sheath 14 to enlarge the intermediate pressure chamber 30 has been dispensed with in this exemplary embodiment.

In this exemplary embodiment, the sheath 14 is firmly retained by a clamping piece 46. The clamping piece 46 is by way of example a deep-drawn component made from a piece of sheet metal, and it is tubular. The clamping piece 46 is pressed into the cup-shaped dividing wall 10 so far that the clamping piece 46 presses the sheath 14 on its face end against the dividing wall 10. As a result, the sheath 14 is firmly retained and fixed on the dividing wall 10.

Openings 46a are provided in the tubular clamping piece and enable a flow of the fluid flow in the direction of the fluid continuation 8. The spring 24a of the spring device 24 is braced on one end on the clamping piece 46 and on the other on the side 20d of the closing body 20. By plastic deformation of the clamping piece 46 in the axial direction that occurs after assembly, the opening pressure of the pressure regulating valve 2 can be adjusted.

Figure 4:
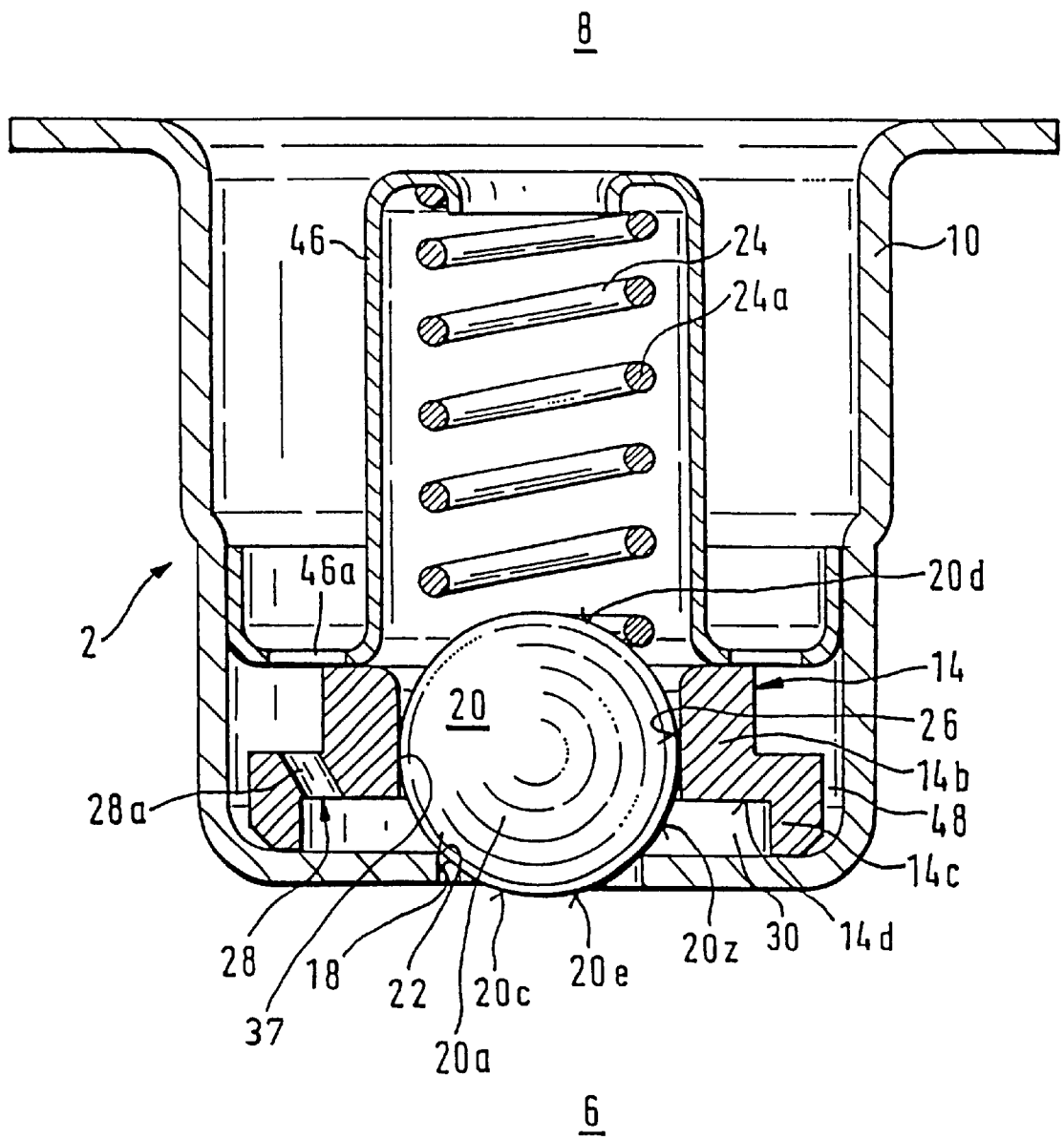

FIG. 4 shows a further preferably selected, especially advantageous exemplary embodiment.

In this exemplary embodiment, the sheath 14 is embodied as a turned part. This makes it especially easy to provide the widened portion 14c between the cylindrical portion 14b and the valve seat 22. As a result, it is easy to make the cross-sectional area of the intermediate pressure chamber 30 relatively large in the circumferential direction, so that the intermediate pressure in the intermediate pressure chamber 30 can act uniformly over the entire circumference on the intermediate pressure face 20z.

The closing body guide 26 is located on the inner jacket face of the cylindrical portion 14b, and the throttle opening 28a, in the region of the shoulder 14d, leads out of the intermediate pressure chamber 30 through the sheath 14 in the direction of the fluid continuation 8.

Figure 5:
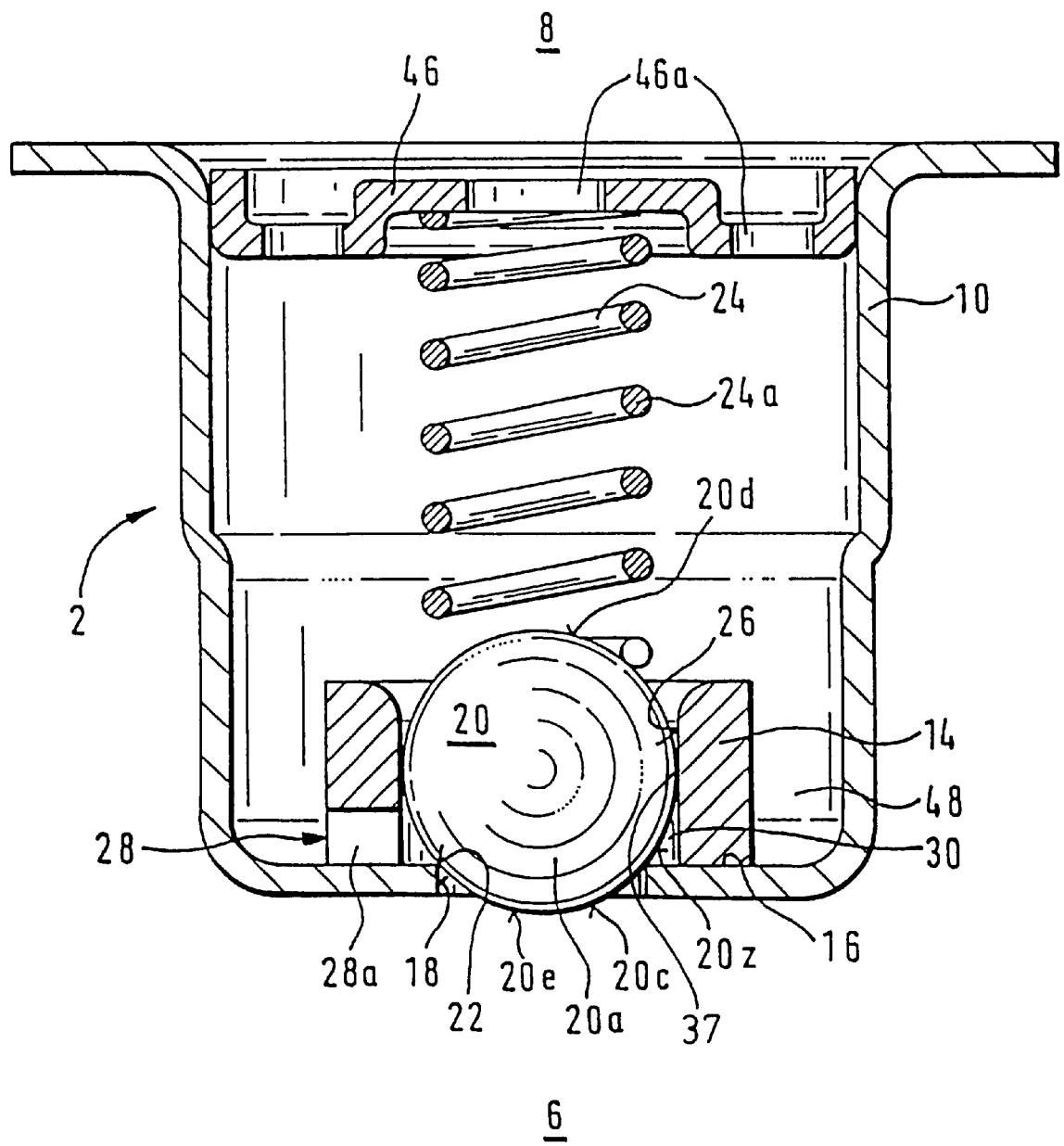

FIG. 5 shows a longitudinal section through a further preferably selected, especially advantageous exemplary embodiment.

In this exemplary embodiment, the sheath 14 is connected firmly to the dividing wall 10 via the materially bonded connection 16. Resistance welding can for instance be employed as one possible connection method.

In the exemplary embodiment shown in FIG. 5, the tube 14 is an especially easily produced turned part or an especially easily produced deep-drawn part, or a cold-headed part which is especially easy to produce by plastic reshaping. However, here as well the sheath 14 can be provided with a graduation, for the sake of enlarging the intermediate pressure chamber 30.

The clamping piece 46, which serves to retain the spring 24a of the spring device 24, is an easily produced sheet-metal part, which is press-fitted into the cup-shaped inner region of the dividing wall 10. By pressing the clamping piece 46 more or less far into the dividing wall 10, the initial tension of the spring 24a and thus the opening pressure of the pressure regulating valve 2 can be adjusted or set.

In the preferred selected exemplary embodiments, there is play 48 all the way around in the radial direction between the sheath 14 and the inner jacket face of the cup-shaped dividing wall 10. This play 48 is provided so that before the sheath 14 is fixed relative to the dividing wall 10, the sheath 14 can be displaced radially relative to the dividing wall 10. The spacing or play 48 extending all the way around makes it possible to align the sheath 14 relative to the dividing wall 10.

In the exemplary embodiments selected for the drawings, the valve seat 22 is located directly on the dividing wall 10. However, it should be noted that the pressure regulating valve 2 can also be modified, specifically in such a way that the valve seat 22 is located directly on the dividing wall 10. This is the case for instance whenever a ring is firmly press-fitted into the fluid opening 18, specifically in such a way that the valve seat 22 is located on an inner surrounding edge of the tightly press-fitted ring.

The following method is proposed for assembling the pressure regulating valve 2, in the exemplary embodiment shown in FIG. 1:

First, the spring 24a and then the closing body 20 are placed in the sheath 14. Next, the sheath 14 is pressed, together with the spring 24a and the closing body 20, against the face end of the dividing wall 10 with slight force. When the sheath 14 is pressed on its face end against the dividing wall 10, then the spring 24a presses the ball 20a into the fluid opening 18 having the valve seat 22 extending all the way around. Pressing the ball 20a into the circular fluid opening 18 against the valve seat 22 creates a centering force exerted on the ball 20a by the valve seat 22. By way of the tight play between the ball 20a and the closing body guide 26 at the sheath 14, the centering force also acts on the sheath 14, with the tendency to center the sheath 14, and thus the closing body guide 26, relative to the valve seat 22. The adequately dimensioned play 48 makes it possible to align the sheath 14.

During the assembly and during the process of aligning the closing body guide 26 relative to the valve seat 22, the sheath 14 is retained against the dividing wall 10. As a result, a force hereinafter called the aligning force is created in the radial direction, or in other words transversely to the longitudinal axis of the closing body guide 26. It should be noted that during the aligning of the closing body guide 26, the aligning force is less than the centering force. In particular, care must be taken, during the aligning, to press the sheath 14 against the dividing wall 10 only just strongly enough that the aligning force is still less than the centering force.

If the aligning force that retains the sheath 14 in the transverse direction is less than the centering force that centers the sheath 14, then in the manner described, the sheath 14 is centered relative to the valve seat 22 and thus relative to the fluid opening 18 in a simple way but with excellent quality.

Once the sheath 14 has been centered relative to the valve seat 22, the sheath 14 is fixed relative to the dividing wall 10. The fixation of the sheath 14 relative to the dividing wall 10 can be done by means of the materially bonded connection 16, for instance. For the materially bonded connection 16, an attractive option is to retain the sheath 14 on its face end against the dividing wall 10 and to join the sheath 14 solidly to the dividing wall 10 via a resistance welding process.

For the assembly of the various exemplary embodiments shown in FIGS. 3 and 4, the following method is proposed:

First, the sheath 14 is placed on its face end against the dividing wall 10. Then the clamping piece 46 is press-fitted into the cup-shaped dividing wall 10. During this press-fitting of the clamping piece 46, the spring 24a of the spring device 24 is placed between the contact point at the clamping piece 46 and the side 20d of the closing body 20. During the assembly, the sheath 14 can be roughly aligned with the aid of a tool that reaches through the openings 46a. As the clamping piece 46 is being press-fitted into the dividing wall 10, the spring 24a presses the ball 20a into the fluid opening 18 and against the valve seat 22. This creates a centering force that acts from the valve seat 22 on the ball 20a, counter to the closing force of the spring 24. This centering force is transmitted from the ball 20a to the sheath 14. The result is excellent centering of the closing body guide 26, provided on the sheath 14, relative to the valve seat 22. In the exemplary embodiments of FIGS. 3 and 4 as well, care must be taken that during the centering operation, the aligning force be kept less than the centering force.

Once the sheath 14 has been aligned relative to the valve seat 22, the clamping piece 46 is press-fitted even substantially more strongly into the cup-shaped dividing wall 10, causing the clamping piece 46 to clamp the sheath 14 against the dividing wall 10 with such great force that slippage of the sheath 14 relative to the dividing wall 10 can no longer ensue. In a simple way, this assures a fixation of the sheath 14 and thus an excellent-quality alignment of the sheath 14 relative to the valve seat 22. After that, if the customer wishes it, the sheath 14 can be welded to the dividing wall 10.

In the exemplary embodiment shown in FIG. 5, the following method is proposed for the assembly of the pressure regulating valve 2:

First, the sheath 14 is placed on its face end against the bottom of the cup-shaped dividing wall 10. Next, the ball 20a representing the closing body 20 is placed in the sheath 14. Then with the aid of the spring 24a, the ball 20a is pressed against the valve seat 22. This creates a centering force acting in the radial direction on the closing body 20. This centering force also acts on the sheath 14 via the ball 20a and thus assures centering of the sheath 14 relative to the valve seat 22 and thus relative to the fluid opening 18. Next, the clamping piece 46 is press-fitted so far into the cup-shaped dividing wall 10 that the spring 24a is pre-stressed so much that the desired opening pressure of the pressure regulating valve 2 is assured. During the centering of the sheath 14 and while the sheath 14 is being fixed on the dividing wall 10, the sheath 14 can be retained with the aid of a tool that reaches the openings 46a.

The foregoing relates to preferred exemplary embodiments of the invention, it being understood that other variants and embodiments thereof are possible within the spirit and scope of the invention, the latter being defined by the appended claims.

We claim:

1. A pressure regulating valve for regulating a pressure of a fluid, in particular in a fuel supply system of an internal combustion engine, the regulating valve having: a fluid inlet (6), having a fluid continuation (8), having a dividing wall (10) dividing the fluid continuation (8) from the fluid inlet (6), a fluid opening (18) leading from the fluid inlet (6) through the dividing wall (10) into the fluid continuation (8), having a closing body (20, 20a, 20b), a valve seat (22) surrounding the fluid opening (18), the valve seat (22) being located at least indirectly on the dividing wall (10), and a spring device (24, 24a) urging the closing body (20, 20a, 20b) towards a position in which it would close the fluid opening (18), characterized in that an outflow throttle restriction (28, 28a) is provided downstream of the valve seat (22) wherein an intermediate pressure chamber (30) is provided between the valve seat (22) and the outflow throttle restriction (28, 28a), the outflow throttle restriction (28, 28a) provides a connection between the intermediate pressure chamber (30) and the fluid continuation (8), and wherein the connection provided by the outflow throttle restriction (28, 28a) is independent of the position of the closing body (20, 20a, 20b).

2. The pressure regulating valve in accordance with claim 1, characterized in that an intermediate pressure chamber (30) is provided between the valve seat (22) and the outflow throttle restriction (28).

3. The pressure regulating valve in accordance with claim 2, characterized in that an intermediate pressure of the fluid in the intermediate pressure chamber urges the closing body (20, 20a, 20b) in the opening direction.

4. The pressure regulating valve in accordance with claim 1, characterized in that the outflow throttle restriction (28, 28a) is disposed on only one, side of the fluid opening (18).

5. The pressure regulating valve of claim 1, characterized in that a closing body guide (26) guiding the closing body (20, 20a, 20b) is provided.

6. The pressure regulating valve in accordance with claim 5, characterized in that the outflow throttle restriction (28, 28a) is provided radially outside the closing body guide (26).

7. The pressure regulating valve of claim 5, characterized in that the closing body guide (26) is formed by a sheath (14), and that the outflow throttle restriction (28, 28a) is provided in the sheath (14).

8. The pressure regulating valve of claim 6, characterized in that the closing body guide (26) is formed by a sheath (14), and that the outflow throttle restriction (28, 28a) is provided in the sheath (14).

9. The pressure regulating valve of claim 1, characterized in that the outflow throttle restriction (28, 28a) is formed by a throttle opening (28a).

10. The pressure regulating valve in accordance with claim 1, characterized in that the closing body (20, 20a, 20b) is formed by at least one ball (20a) urged against the valve seat (22).

11. The pressure regulating valve in accordance with claim 1, characterized in that the closing body (20, 20a, 20b) is formed by at least two balls (20a, 20b) solidly joined to one another.

12. The pressure regulating valve of claim 1, characterized in that a damping device (40) is provided, and the closing body (20, 20a, 20b) has one side (20c) toward the fluid inlet (6) and one side (20d) remote from the fluid inlet (6), and the damping device (40) is formed in that on the side (22) of the closing body (20, 20a, 20b) remote from the fluid inlet (6), a damper chamber (32) is provided, and that a delivery throttle opening (36, 36a, 36b) leads from the fluid inlet (6) into the damper chamber (32), and a discharge throttle opening (38, 38a) leads from the damper chamber (32) into the fluid continuation (8).

13. The pressure regulating valve in accordance with claim 12, characterized in that the closing body is guided by a closing body guide (26), and the delivery throttle opening (36, 36a, 36b) is formed by a gap between the closing body (20, 20a, 20b) and the closing body guide (26).

14. The pressure regulating valve in accordance with claim 12, characterized in that the discharge throttle opening (38, 38a) is formed by a hole (38a) connecting the damper chamber (32) to the fluid continuation (8).

15. The pressure regulating valve in accordance with claim 13, characterized in that the discharge throttle opening (38, 38a) is formed by a hole (38a) connecting the damper chamber (32) to the fluid continuation (8).

16. The pressure regulating valve in accordance with claim 12, characterized in that the spring device (24, 24a) acts on the closing body (20, 20a, 20b) is formed by a spring (24a) disposed in the damper chamber (32).

17. A method for producing a pressure regulating valve serving to regulate a pressure of a fluid, the regulating valve having: a fluid inlet (6), a fluid continuation (8), a dividing wall (10) dividing the fluid continuation (8) from the fluid inlet (6), a fluid opening (18) leading from the fluid inlet (6) through the dividing wall (10) towards the fluid continuation (8), a closing body (20, 20a, 20b), which can close the fluid opening (18) but can be opened by means of fluid pressure at the fluid inlet (6), a valve seat (22) surrounding the fluid opening (18), the valve seat (22) being at least indirectly on the dividing wall (10), a closing body guide (26) guiding the closing body (20, 20a, 20b), and a spring device (24, 24a) urging the closing body (20, 20a, 20b) with a closing force toward the valve seat (22), characterized in that the closing body guide (26) is formed on a sheath (14) that can be connected to the dividing wall (10), wherein upon assembly of the pressure regulating valve (2), after the spring device (24, 24a) and the closing body (20, 20a, 20b) have been installed, the sheath (14) is retained relative to the dividing wall (10) transversely to the longitudinal axis of the closing body guide (26), by an axial aligning force, the aligning force being less than a transverse centering force that is engendered by the action of the valve seat (22) on the closing body (20, 20a, 20b) and is exerted on the sheath (14) via the closing body (20, 20a, 20b), and that after a resultant centering of the closing body guide (26) relative to the valve seat (22), the sheath (14) is fixed relative to the dividing wall (10).

18. The method of claim 17, characterized in that the fixation of the sheath (14) relative to the dividing wall (10) is effected by means of a materially bonded connection (16).

19. The method of claim 18, characterized in that the materially bonded connection (16) is a welded connection (16) that retains the sheath (14) on the dividing wall (10).

20. The method of claim 17, characterized in that a clamping piece (46), connected to the dividing wall (10) via a clamp connection, is provided, and the clamping piece (46) fixes the sheath (14) relative to the dividing wall (10).

21. A pressure regulating valve in accordance with claim 1, wherein the closing body (20, 20a, 20b) opens and closes the fluid opening (18) as a function of the pressure difference between fluid inlet (6) and fluid continuation (8).

22. The method of claim 17, wherein the closing body (20, 20a, 20b) opens and closes the fluid opening (18) as a function of the pressure difference between fluid inlet (6) and fluid continuation (8).

23. A pressure regulating valve for regulating a pressure of a fluid, in particular in a fuel supply system of an internal combustion engine, the regulating valve having: a fluid inlet (6), having a fluid continuation (8), having a dividing wall (10) dividing the fluid continuation (8) from the fluid inlet (6), a fluid opening (18) leading from the fluid inlet (6)

through the dividing wall (10) into the fluid continuation (8), having a closing body (20, 20a, 20b), a valve seat (22) surrounding the fluid opening (18), the valve seat (22) being located at least indirectly on the dividing wall (10), and a spring device (24, 24a) urging the closing body (20, 20a, 20b) towards a position in which it would close the fluid opening (18), characterized in that an outflow throttle restriction (28, 28a) is provided downstream of the valve seat (22) wherein an intermediate pressure chamber (30) is provided between the valve seat (22) and the outflow throttle restriction (28, 28a), the outflow throttle restriction (28, 28a) connects the intermediate pressure chamber (30) to the fluid continuation (8), wherein the communication provided between the intermediate pressure chamber (30) and the fluid continuation (8) via the outflow throttle restriction (28, 28a) is independent of the position of the closing body (20, 20a, 20b), and further characterized in that a closing body guide (26), guiding the closing body (20, 20a, 20b) is provided, a constriction (37) is formed between the closing body (20, 20a, 20b) and the closing body guide (26), and the intermediate pressure chamber (30) is provided between the valve seat (22) and the constriction (37).

* * * * *